US009363005B2

(12) United States Patent
Mahe et al.

(10) Patent No.: US 9,363,005 B2
(45) Date of Patent: Jun. 7, 2016

(54) ADAPTIVE ANTENNA DIVERSITY SYSTEM

(75) Inventors: Isabel G. Mahe, Los Altos, CA (US);
Jianxiong Shi, Pleasanton, CA (US);
Kee-Bong Song, Santa Clara, CA (US);
Ming Hu, Sunnyvale, CA (US); William S. Burchill, San Jose, CA (US); Syed A. Mujtaba, Santa Clara, CA (US);
Johnson O. Sebeni, Fremont, CA (US);
Haining Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 12/941,008

(22) Filed: Nov. 5, 2010

(65) Prior Publication Data
US 2012/0115553 A1  May 10, 2012

(51) Int. Cl.
*H04M 1/00*  (2006.01)
*H04B 7/08*  (2006.01)
*H04W 52/02*  (2009.01)

(52) U.S. Cl.
CPC ............ *H04B 7/0874* (2013.01); *H04B 7/0825* (2013.01); *H04W 52/0245* (2013.01)

(58) Field of Classification Search
CPC ............ H04B 1/44; H04B 1/52; H01Q 1/243; H01Q 1/242
USPC ............ 455/575.7, 132, 88, 137, 562.1, 101, 455/73, 78; 343/702; 370/275, 297, 334; 375/267, 299
See application file for complete search history.

(56) References Cited

U.S. PATENT DOCUMENTS

| 5,159,707 | A | * | 10/1992 | Mogi et al. ............... 455/134 |
| 5,768,691 | A | | 6/1998 | Matero et al. |
| 6,021,317 | A | * | 2/2000 | Irvin ........................ 455/78 |
| 6,049,705 | A | * | 4/2000 | Xue ......................... 455/277.1 |
| 6,339,400 | B1 | | 1/2002 | Flint et al. |
| 6,560,443 | B1 | * | 5/2003 | Vaisanen et al. ........... 455/73 |

(Continued)

FOREIGN PATENT DOCUMENTS

| EP | 1093098 | 4/2001 |
| EP | 1280230 | 1/2003 |

(Continued)

OTHER PUBLICATIONS

Mow et al. U.S. Appl. No. 12/831,180, filed Jul. 6, 2010.

(Continued)

*Primary Examiner* — Nay A Maung
*Assistant Examiner* — Angelica M Perez
(74) *Attorney, Agent, or Firm* — Meyertons, Hood, Kivlin, Kowert & Goetzel, P.C.

(57) ABSTRACT

Electronic devices may be provided that contain wireless communications circuitry. The wireless communications circuitry may include radio-frequency transceiver circuitry with first and second ports that are coupled by switching circuitry to first and second antennas. A first receiver in the transceiver circuitry may be associated with the first port and a second receiver in the transceiver circuitry may be associated with the second port. An electronic device may be operated in a single receiver mode in which only one of the receivers is active to conserve power or a dual receiver mode in which signals from both antennas may be received in parallel to compare antenna performance. Based on antenna performance metrics, the electronic device may adjust the switching circuitry to ensure that an optimal antenna is being used.

26 Claims, 6 Drawing Sheets

(56) References Cited

U.S. PATENT DOCUMENTS

| | | |
|---|---|---|
| 6,885,880 B1 | 4/2005 | Ali |
| 7,155,178 B2 | 12/2006 | Chang et al. |
| 7,239,889 B2 | 7/2007 | Saari et al. |
| 7,271,769 B2 | 9/2007 | Asano et al. |
| 7,768,461 B2 | 8/2010 | Cheng et al. |
| 2004/0227674 A1 | 11/2004 | Asano et al. |
| 2004/0257283 A1 | 12/2004 | Asano et al. |
| 2005/0064903 A1* | 3/2005 | Uotsu et al. ............... 455/556.1 |
| 2005/0073462 A1 | 4/2005 | Lin et al. |
| 2006/0001582 A1 | 1/2006 | Hayashi |
| 2006/0109184 A1 | 5/2006 | Chen et al. |
| 2007/0218853 A1 | 9/2007 | Yu |
| 2008/0018541 A1 | 1/2008 | Pang et al. |
| 2008/0316115 A1 | 12/2008 | Hill et al. |

FOREIGN PATENT DOCUMENTS

| | | | | |
|---|---|---|---|---|
| EP | 1995889 | 11/2008 | | |
| WO | 01/05088 | 1/2001 | | |
| WO | 01/59945 | 8/2001 | | |
| WO | WO 01/59945 | * 8/2001 | ............... | H04B 1/16 |
| WO | 03096474 | 11/2003 | | |
| WO | 2004/047309 | 6/2004 | | |
| WO | 2004102744 A1 | 11/2004 | | |
| WO | 2008055039 | 5/2008 | | |
| WO | 2010025023 | 3/2010 | | |

OTHER PUBLICATIONS

Schlub et al. U.S. Appl. No. 12/759,243, filed Apr. 13, 2010.
Caballero et al. U.S. Appl. No. 12/941,011, filed Nov. 5, 2010.
Caballero et al. U.S. Appl. No. 12/941,010, filed Nov. 5, 2010.

* cited by examiner

ADAPTIVE ANTENNA DIVERSITY SYSTEM

BACKGROUND

This relates generally to wireless communications circuitry, and more particularly, to electronic devices that have wireless communications circuitry with multiple antennas.

Electronic devices such as portable computers and cellular telephones are often provided with wireless communications capabilities. For example, electronic devices may use long-range wireless communications circuitry such as cellular telephone circuitry to communicate using cellular telephone bands at 850 MHz, 900 MHz, 1800 MHz, 1900 MHz, and 2100 MHz. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

Antenna performance affects the ability of a user to take advantage of the wireless capabilities of an electronic device. If antenna performance is not satisfactory, calls may be dropped or data transfer rates may be come undesirably slow. To ensure that antenna performance meets design criteria, it may sometimes be desirable to provide an electronic device with multiple antennas. In the event that one of the antennas in the device is not performing as well as desired, another of the antennas can be switched into use. Schemes in which antennas are switched into use in real time based on antenna performance criteria are sometimes referred to as antenna diversity schemes.

Care must be taken when implementing an antenna diversity scheme in an electronic device. If poor decisions are made in controlling wireless device circuitry or if the wireless circuitry in a device is insufficiently flexible, wireless performance and power consumption performance may suffer.

It would therefore be desirable to be able to provide improved wireless communications circuitry for wireless electronic devices with multiple antennas.

SUMMARY

Electronic devices may be provided that contain wireless communications circuitry. The wireless communications circuitry may include radio-frequency transceiver circuitry with antenna ports that are coupled to antennas in the electronic device.

The transceiver circuitry may, for example, have first and second ports that are coupled to first and second cellular telephone antennas. Switching circuitry may be interposed between the transceiver circuitry and the antennas to allow the antennas to be swapped between ports. The switching circuitry may, for example, have a first operating mode in which the first antenna is coupled to the first transceiver port and the second antenna is coupled to the second transceiver port and a second operating mode in which the first antenna is coupled to the second transceiver port while the second antenna is coupled to the first transceiver port.

Control circuitry may use information on received signal powers, frame error rates for received signals, information on transmitted signal powers, and other information on the radio-frequency signals being handled by the transceiver circuitry in determining how to control the wireless communications circuitry. The control circuitry may, for example, use information from the transceiver in determining whether to activate or deactivate transceiver ports and in determining whether or not to adjust the switching circuitry.

A first receiver in the transceiver circuitry of an electronic device may be associated with the first transceiver port and a second receiver in the transceiver circuitry may be associated with the second transceiver port. The electronic device may be operated in a single receiver mode in which only one of the receivers is active to conserve power or a dual receiver mode in which signals from both antennas may be received in parallel to compare antenna performance. Based on received signal data and other data from the transceiver, the electronic device may adjust the switching circuitry to ensure that an optimal antenna is being used.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. The wireless communications circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures, traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
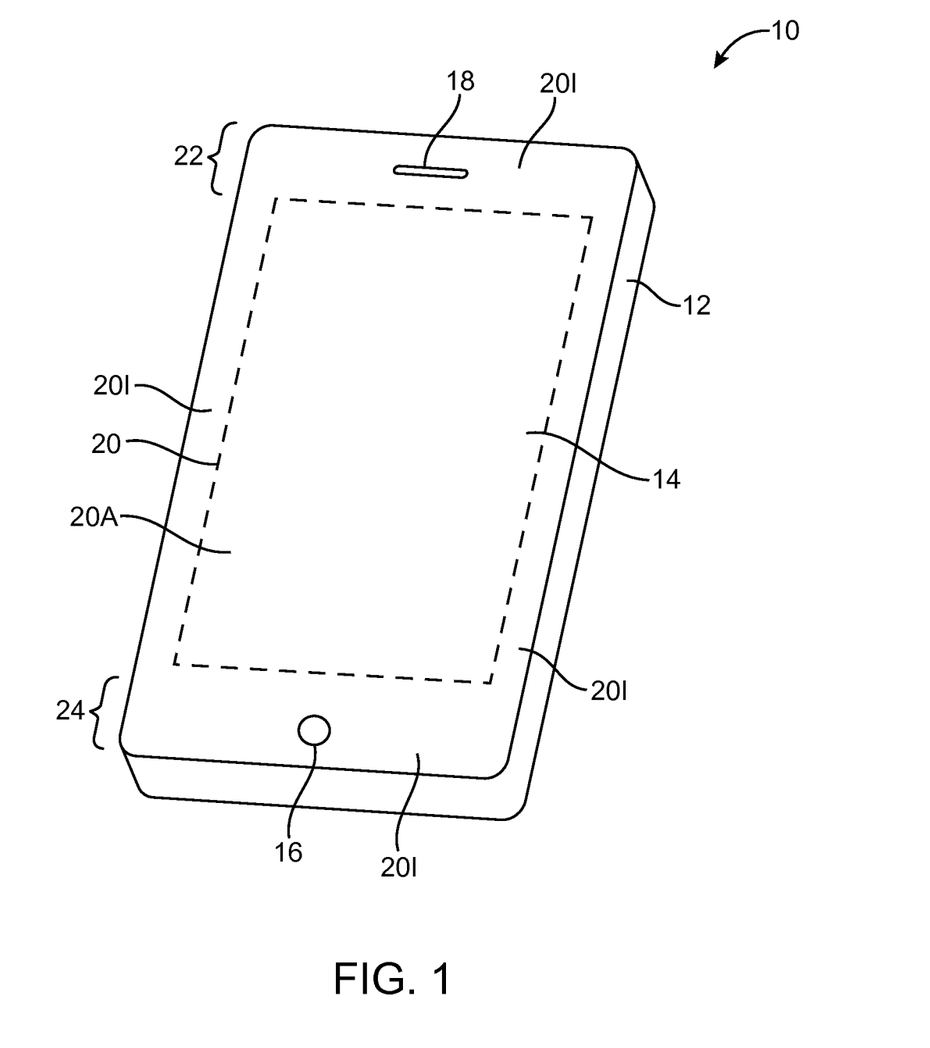
FIG. 1 is a perspective view of an illustrative electronic device with wireless communications circuitry having multiple antennas in accordance with an embodiment of the present invention.

An illustrative electronic device of the type that may be provided with one or more antennas is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 20I may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example).

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas).

In regions 22 and 20, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 20 and 22.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used.

In configurations in which the antennas in regions 22 and 24 are not identical, use of one antenna may be favored over the other. For example, it may be preferable to use the antenna in region 24 rather than the antenna in region 22 due to considerations such as superior efficiency, superior band coverage, superior radiation patterns, etc. In configurations such as these in which it is preferably to use the first antenna (e.g., the cellular antenna in region 24) over the second antenna (e.g., the cellular antenna in region 22), the first antenna may be referred to as the primary antenna for device 10 and the second antenna may be referred to as the secondary antenna for device 10. Device 10 may attempt to use the primary antenna as much as possible (due to factors such as superior efficiency, band coverage, or radiation pattern), but may switch to using the secondary antenna when operation of the primary antenna is disrupted. Antenna operation can be disrupted when an antenna in device 10 is blocked by an external object such as a user's hand, when device 10 is placed near objects the interfere with proper antenna operation, or due to other factors (e.g., device orientation relative to its surroundings, etc.). If desired, both the primary and secondary antennas may be used simultaneously (e.g., when receiving signals). This type of arrangement may be used, for example, to improve reception quality by combining signals that have been received using the primary antenna with signals that have been received using the secondary antenna.

Antenna diversity systems in which device 10 has a primary antenna and a secondary antenna are sometimes described herein as an example. This is, however, merely illustrative. Device 10 may use an antenna diversity arrangement that is based on three or more antennas, may use antennas that are substantially identical (e.g., in band coverage, in efficiency, etc.), or may use other types of antenna configurations.

Figure 2:
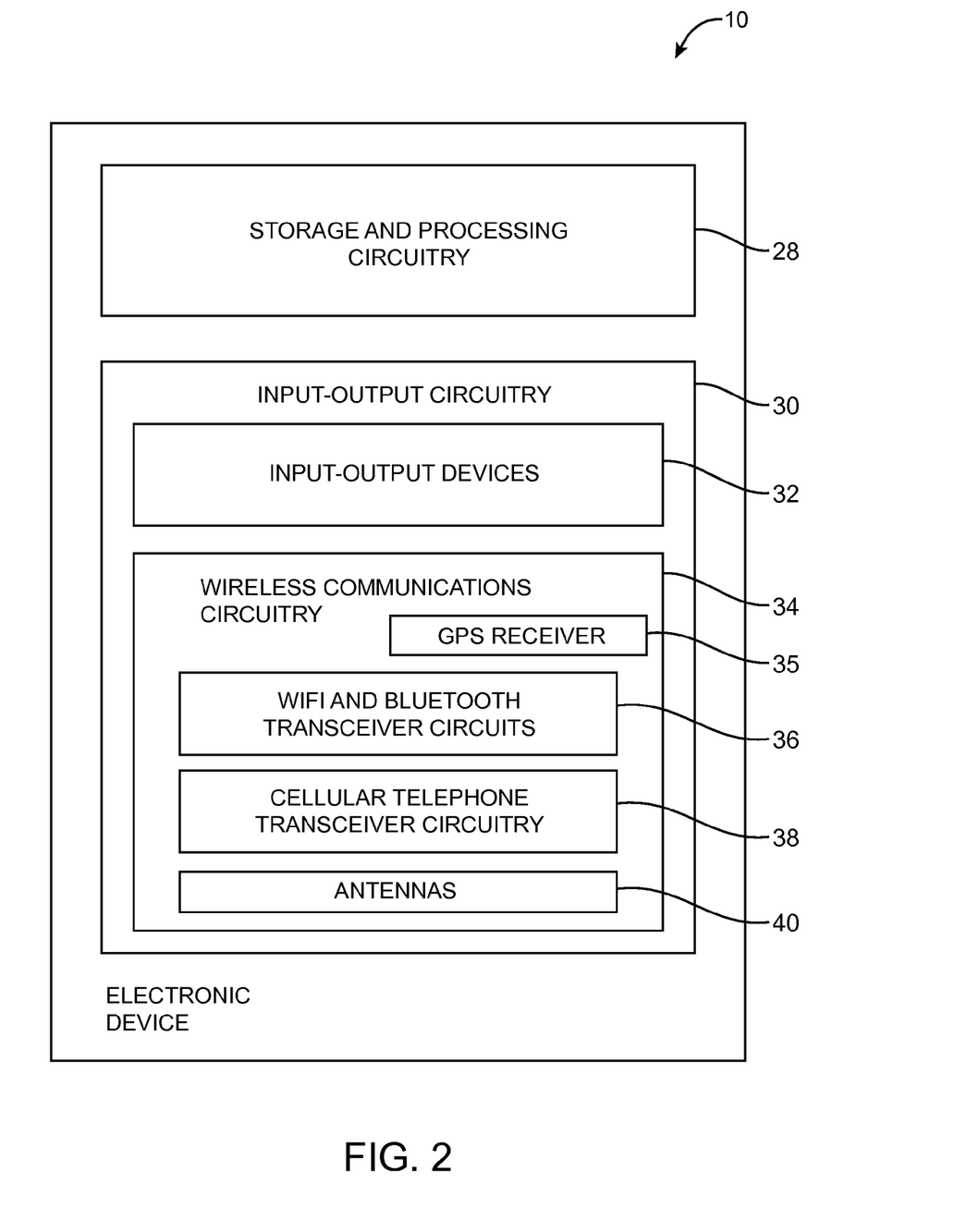
FIG. 2 is a schematic diagram of an illustrative electronic device with wireless communications circuitry having multiple antennas in accordance with an embodiment of the present invention.

A schematic diagram of electronic device 10 is shown in FIG. 2. As shown in FIG. 2, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or other multi-antenna schemes, circuitry 28 may perform transmitted and received signal monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing data streams over two or more antennas in device 10 in parallel, etc. Circuitry 28 may also activate and deactivate transceiver circuitry to provide desired levels of signal monitoring while conserving power. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), and may otherwise control and adjust the components of device 10. Control algorithm data such as settings for predetermined threshold values and other control settings may be stored in storage in circuitry 28.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired. For example, wireless communications circuitry 34 may include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be a primary cellular telephone antenna in region 24 of device 10 and a secondary cellular telephone antenna in region 22 of device 10. These antennas may be fixed or may be tunable.

Figure 3:
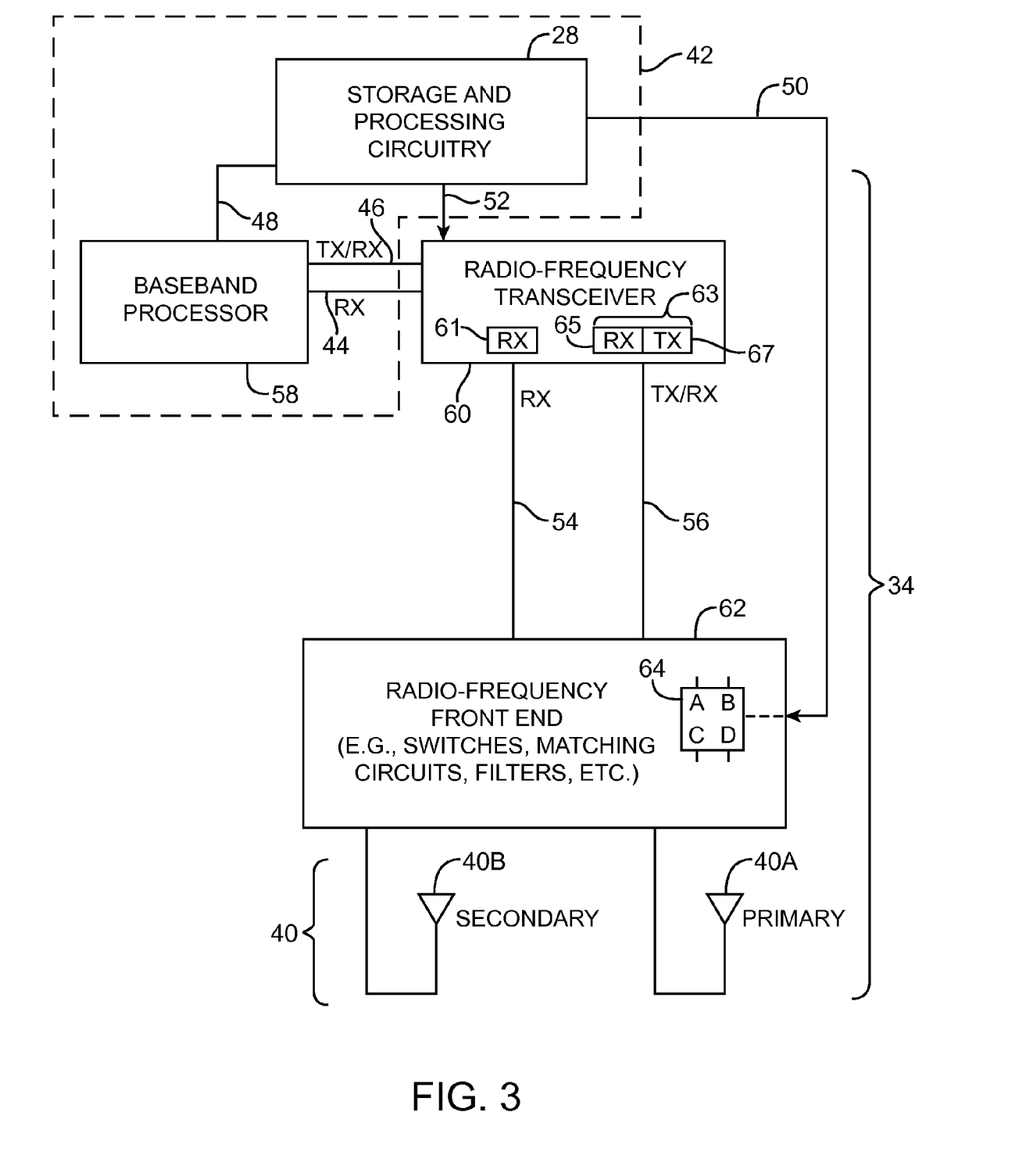
FIG. 3 is a diagram of illustrative wireless circuitry including multiple antennas and circuitry for controlling use of the antennas in real time in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics such as received power, transmitted power, frame error rate, bit error rate, signal-to-noise ratio, information on whether responses are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, and other information that is reflective of the performance of wireless circuitry 34. This information may be gathered for multiple antennas in real time using multiple active transceiver ports or using a time-division multiplexing scheme in which an alternate antenna(s) is momentarily used to evaluate its performance. Information on antenna performance metrics that has been gathered can be processed by storage and processing circuitry 28 and/or processor 58. In response to determining that predetermined criteria have been satisfied, storage and processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Baseband processor 58 may receive digital data that is to be transmitted from storage and processing circuitry 28 and may use path 46 and radio-frequency transceiver circuitry 60 (e.g., transmitter 67 in transceiver 63) to transmit corresponding radio-frequency signals on path 56. Radio-frequency front end 62 may be coupled between radio-frequency transceiver 60 and antennas 40 and may be used to transmit the radio-frequency signals. Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port RX and receiver 63 at port TX/RX, and paths such as paths 44 and 46. Baseband processor 58 may convert these received signals into digital data that is provided to storage and processing circuitry 28.

Radio-frequency transceiver circuitry 60 may have receiver circuitry and transmitter circuitry. Receiver and transmitter circuitry may be shared between multiple ports using multiplexer circuitry and/or individual receivers and/or transmitters may be associated with respective transceiver ports. As shown in FIG. 3, for example, radio-frequency transceiver 60 may have a receiver such as receiver 61 that is associated with path 54 and may have receiver and transmitter circuitry 63 including a receiver such as receiver 65 and a transmitter such as transmitter 67 that is associated with path 56. Path 54 and receiver 61 may be associated with a first (RX) port for transceiver 60, whereas path 56, receiver 65, and transmitter 67 may be associated with a second (TX/RX) port for transceiver 60. If desired, additional ports may be provided in transceiver 60. Transceiver 60 may also be provided with additional receivers and/or transmitters or may be provided with fewer transceiver resources (i.e., shared resources). The arrangement of FIG. 3 is merely illustrative.

Radio-frequency front end 62 may include radio-frequency switches, impedance matching circuits, filters, and other circuitry for forming an adjustable interface between antennas 40 and radio-frequency transceiver 60. Radio-frequency front end 62 may include a switch such as switch 64 (e.g., a double pole double throw switch) that has four ports. Port A may be coupled to path 54, port B may be coupled to path 56, port C may be coupled to antenna 40B, and port D may be coupled to antenna 40A. Antennas 40A and 40B may be primary and secondary cellular telephone antennas for device 10, respectively.

Switch 64 may be configured by control signals received from control circuitry 42 over path 50. When primary antenna 40A is performing satisfactorily, for example, switch 64 may be placed in a first configuration in which switch port B is coupled to switch port D and in which switch port A is coupled to switch port C. In this first configuration, the TX/RX (transmit-receive) port of transceiver 60 is coupled to antenna 40A while the RX (receive) port of transceiver 60 is connected to antenna 40B. When, however, primary antenna 40A is not performing as well as secondary antenna 40B, switch 64 may be placed in a second configuration in which switch port B is coupled to switch port C and in which switch port A is coupled to switch port D. This will swap the antenna assignments within wireless circuitry 34, so that secondary antenna 40B handles the signals for the TX/RX port of transceiver 60 while primary antenna 40A handles the signals for the RX port.

In the example of FIG. 3, transceiver 60 has a TX/RX port that is coupled to line 56 and a corresponding TX/RX path (path 46) that couples radio-frequency transceiver 60 to baseband processor 58. Transceiver 60 of FIG. 3 also has an RX port that is coupled to line 54 and a corresponding RX path (path 44) that couples transceiver 60 and baseband processor 58. This type of configuration is merely illustrative. If desired, ports such as the RX and TX/RX port of transceiver 60 may both be configured to receive and transmit signals (i.e., both may be transmit-receive ports) and/or transceiver 60 may have a single port that is shared between multiple antennas using a multiplexer.

To conserve power, storage and processing circuitry 28 may issue control signals on path 52 that selectively activate and deactivate features of transceiver 60. With one suitable arrangement, transceiver 60 includes a first receiver (receiver 61) for handling received signals on the RX port and a second receiver (receiver 65) for handling received signals on the TX/RX port. When both receivers are not needed, one of the receivers can be deactivated to conserve power.

Control operations such as operations associated with configuring switch 64 and other circuits in radio-frequency front end 62 using path 50 and operations associated with configuring radio-frequency transceiver 60 using path 52 (e.g., to activate and deactivate receiver circuits associated with ports RX and TX/RX) may be performed using a control algorithm that is implemented on control circuitry 42 (e.g., using the control circuitry and memory resources of storage and processing circuitry 28 and baseband processor 58). With one suitable arrangement, baseband processor 58 may gather and provide data on path 48 that is indicative of wireless performance. For example, baseband processor 58 may use transceiver 60 to produce data on path 48 such as frame-error rate (FER) data, received power data (e.g., received power for port RX and received power for port TX/RX), signal-to-noise ratios, transmit power (e.g., the power being transmitted using the TX/RX port), bit-error-rate (BER) data, and other wireless performance metrics. Baseband processor 58 or other resources in control circuitry 42 may gather wireless performance information in real time. For example, baseband processor 58 may use transceiver 60 to gather real time received power values and real time transmitted power values for the ports associated with transceiver 60. Data such as frame error rate data or other data-based performance metrics may be produced by determining the fraction of data frames that are dropped as incoming frames are processed using baseband processor 58. If desired, control circuitry 42 may gather wireless performance data (or data that is reflective of expected wireless performance) using sensors in device 10, using feedback from a cellular network, etc.

Raw wireless performance data may be processed using digital and/or analog circuits, using software-implemented filtering, or using a combination of hardwired and software-based processing algorithms. For example, raw received power measurements or other raw signal measurements may be filtered using a digital smoothing algorithm (e.g., a time-averaging algorithm), using an analog filter (e.g., a low pass filter), using hardwired digital filter circuits, using software-implemented filters, etc.

Figure 4:
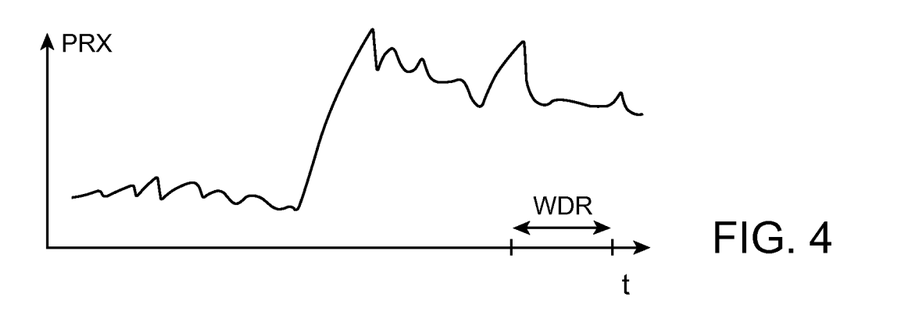
FIG. 4 is a graph showing how a received signal parameter such as received signal power may be measured as a function of time using wireless circuitry in accordance with an embodiment of the present invention.
Figure 5:
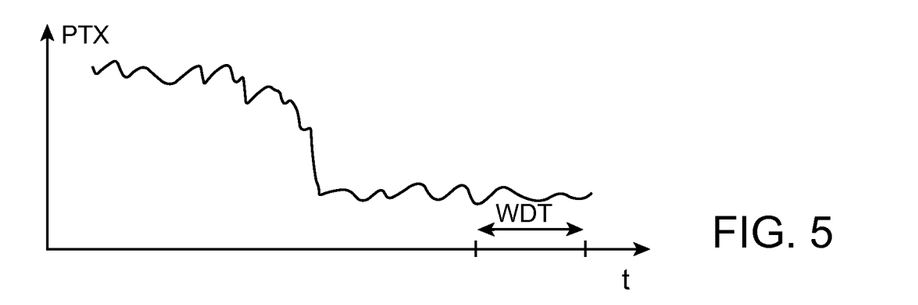
FIG. 5 is a graph showing how a transmitted signal parameter such as transmitted signal power may be measured as a function of time using wireless circuitry in accordance with an embodiment of the present invention.
Figure 6:
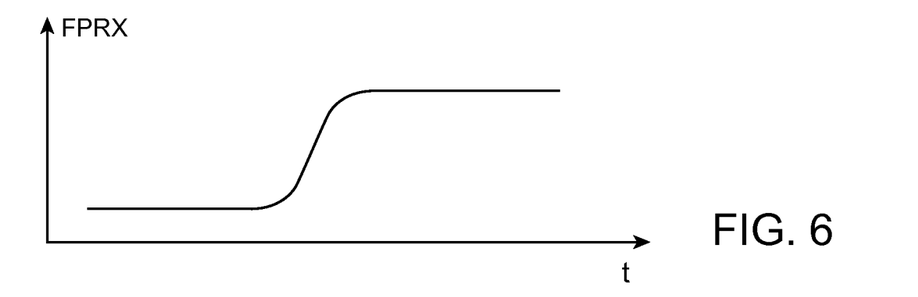
FIG. 6 is a graph showing how raw received signal parameter measurements such as raw received signal power measurements may be processed to produce filtered received signal measurements in accordance with an embodiment of the present invention.
Figure 7:
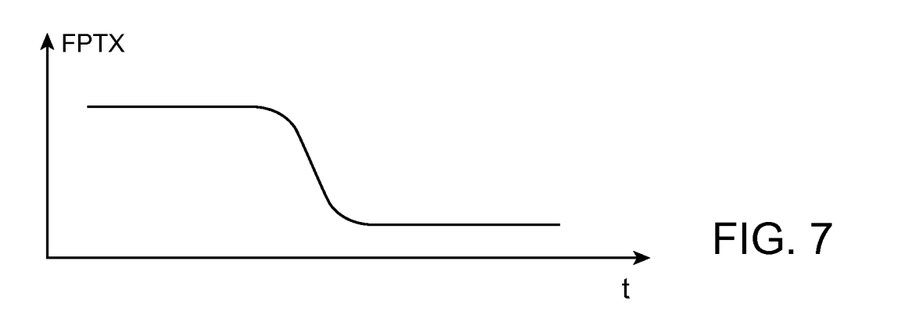
FIG. 7 is a graph showing how raw transmitted signal parameter measurements such as raw transmitted signal power measurements may be processed to produce filtered transmitted signal measurements in accordance with an embodiment of the present invention.

FIGS. 4 and 5 are graphs illustrating how raw data may be fairly noisy. In FIG. 4, wireless performance data PRX has been plotted as a function of time. In FIG. 5, wireless performance data PTX has been plotted as a function of time. Parameters PRX and PTX may respectively correspond to raw measured received power and raw measured transmitted power or may correspond to other wireless performance parameters. The graph of FIG. 6 shows how the raw data PRX of FIG. 4 may be filtered to produce filtered data FPRX (e.g., time-averaged received power or other performance data). The graph of FIG. 7 shows how the raw data PTX of FIG. 5 may be filtered to produce filtered data FPTX (e.g., time-averaged transmitted power or other performance data). Time averaging for smoothing raw data PRX and for smoothing raw data PTX may be performed, for example, using time-averaging windows such as window WDR of FIG. 4 and WDT of FIG. 5. When an averaging window is used, the raw data that lies within the window may be averaged to produce a filtered data point (e.g., FPRX or FPTX in the present example). Larger averaging windows may be used when more smoothing is desired. Smaller averaging windows may be used when it is desired to ensure rapid response times for control circuitry 42. Time-averaging schemes reduce noise by creating a low pass filter that removes high-frequency signal components from unprocessed data. Other types of noise reduction schemes may be used if desired. The use of time averaging in the examples of FIGS. 4, 5, 6, and 7 is merely illustrative.

It may be desirable to operate wireless circuitry 34 in a mode that allows wireless performance to be independently evaluated for each antenna. Based on this information, control circuitry 42 (FIG. 3) may determine whether or not the antenna assignments in device 10 should be swapped and whether or not power can be conserved by reducing the amount of active transceiver circuitry in device 10.

Wireless performance for both antennas may be monitored simultaneously by activating the transceiver circuits associated with a pair of transceiver ports and using these ports simultaneously. For example, receiver 61 of port RX of FIG. 3 may be used to monitor received signal power while receiver 65 of port TX/RX of FIG. 3 may be used to monitor received signal power. Signal power for more than two antennas can also be independently measured using corresponding receivers in radio-frequency transceiver 60.

In some situations, it may be desirable to share a common transceiver port between multiple antennas. For example, if a transceiver integrated circuit is being used that contains only a single receiver, that receiver can be shared between the primary and secondary antennas in device 10 using a multiplexer. Device 10 can use the multiplexer to couple one antenna into use as the current active antenna for handling wireless signals. For a fraction of the time that the currently active antenna is used (e.g., for 5% or less or 1% or less of the time that the currently active antenna is being used), device 10 can use the multiplexer to switch the other antenna into use to probe the wireless performance of the other antenna.

Figure 8:
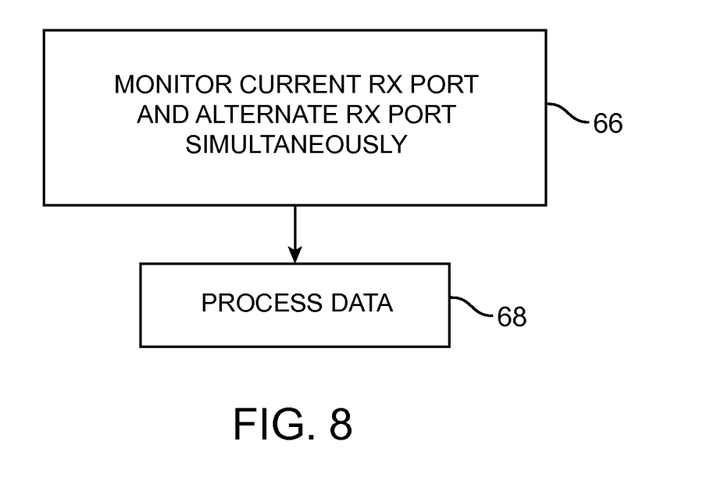
FIG. 8 is a flow chart of illustrative steps involved in gathering and processing received signals from multiple ports in parallel in accordance with an embodiment of the present invention.

FIG. 8 is a flow chart of illustrative steps that may be used in a wireless circuit configuration in which the transceiver contains multiple ports (e.g., the RX port coupled to path 54 of FIG. 3 and the TX/RX port coupled to path 56 in FIG. 3). During the operations of step 66, control circuitry 42 may activate the receivers on both ports and may gather data for each port. Control circuitry 42 may process the data that is gathered to produce processed wireless performance data (step 68).

Any suitable resources in device 10 may be used in ascertaining the wireless performance of each port and its associated antenna. For example, baseband processor 58 may contain processing circuitry that can compute a frame error rate value for each port by counting the number of successfully received and unsuccessfully received frames in the data stream associated with each port. Baseband processor 58 may also contain circuitry for converting raw signal measurements into received power values. During operation, the circuitry of baseband processor 58 or other control circuitry 42 may be used to assess the wireless performance of each of the simultaneously active ports (and therefore the antenna that is coupled to each port), so that control circuitry 42 can make suitable adjustments to radio-frequency transceiver 60 via path 52 and radio-frequency front end 62 (via path 50).

Figure 9:
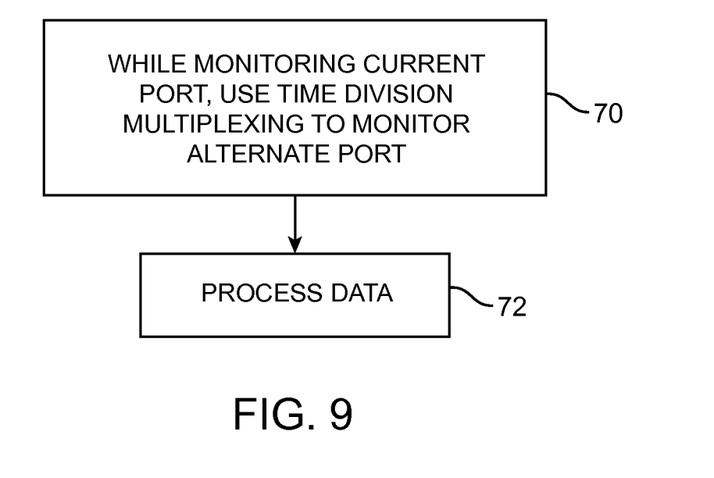
FIG. 9 is a flow chart of illustrative steps involved in gathering and processing received signals from multiple ports using a time division multiplexing scheme in accordance with an embodiment of the present invention.

The performance of each antenna can also be monitored using a time-division multiplexing scheme in which a multiplexer or other switching circuitry is used to momentarily switch from use of the current antenna to use of an alternate antenna so that the performance of the alternate antenna can be sampled. Illustrative steps involved in using a time-division multiplexing scheme of this type are shown in FIG. 9. During the operations of step 70, control circuitry 42 may monitor the signals associated with a given radio-frequency transceiver port. These signals may be associated with one of multiple antennas in device 10 (i.e., a currently active antenna). Periodically, control circuitry 42 may adjust the multiplexer or other switching circuitry (e.g., a multiplexer in radio-frequency front end 62), so that the alternate antenna is coupled to the transceiver port in place of the current antenna. Alternate antenna measurements may be made during time periods in which the current antenna is known to be inactive (e.g., during time slots in which the cellular telephone transceiver in device 10 is not actively using the current antenna).

Data gathered using the current antenna and data gathered using the alternate antenna may be processed by control circuitry 42 during the operations of step 72. For example, current antenna data and alternate antenna data may be processed to produce wireless performance data such as measured values of received power (PRX), frame error rate (FER), etc.

Figure 10:
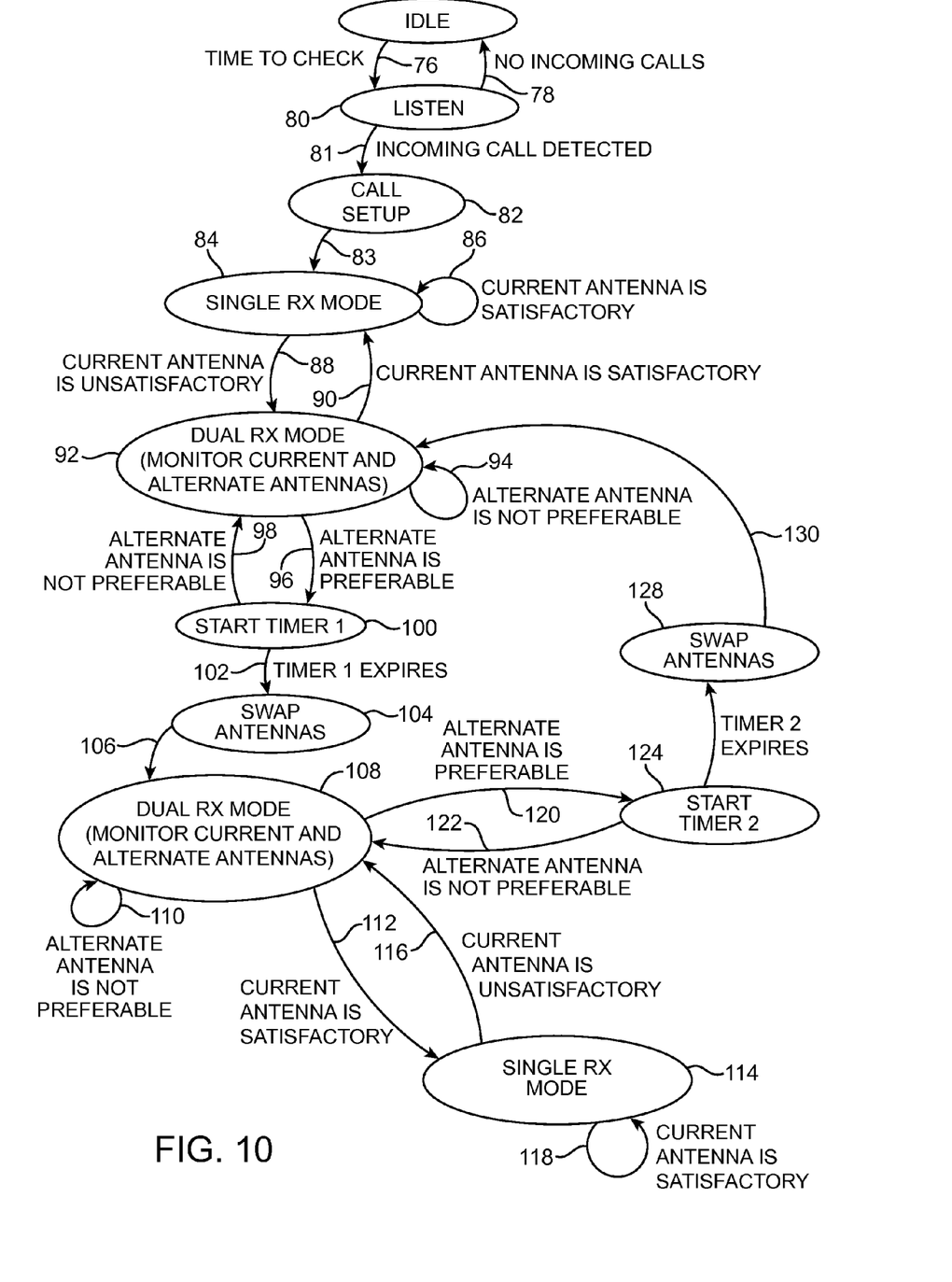
FIG. 10 is a diagram showing operations and operating states associated with operating an electronic device having wireless circuitry of the type shown in FIG. 3 in accordance with an embodiment of the present invention.

A diagram illustrating how device 10 may ensure that an optimum antenna is used while disabling transceiver circuitry when possible to conserve power is shown in FIG. 10.

Initially, at state 74, device 10 and wireless circuitry 34 are in an idle state. During idle state 74, wireless circuitry 34 is in a low power state and is not handling any cellular telephone calls.

Periodically, control circuitry 42 may awaken wireless circuitry 34 to listen for incoming calls, as indicated by line 76. During the operations of state 80, device 10 may monitor the wireless network for incoming calls (e.g., by listening for a message on a paging channel or other channel that indicates that an incoming call is being made). When entering listening state 80, device 10 may initially use port TX/RX to monitor primary antenna 40A. If primary antenna 40A is not performing satisfactorily (e.g., if the power of the received signal is less than received power threshold TH1 or if other suitable performance metric indicates that antenna 40A is not performing well), control circuitry 42 can listen for incoming call setup messages using port RX and antenna 40B or control circuitry 42 can toggle the state of switch 64 so that port TX/RX can be used to listen for incoming call setup messages from antenna 40B. If no incoming call activity is detected, device 10 may temporarily return to idle state 74, as indicated by line 78.

If an incoming call is detected during the listening operations of state 80, processing may proceed to call setup state 82, as indicated by line 81. Device 10 may also enter call setup state 82 when a user of device 10 initiates an outgoing call. During call setup state 82, device 10 may use control circuitry 42 to set up a cellular telephone call. In setting up the call, control circuitry 42 can determine whether antenna 40A or antenna 40B should be used as the initial antenna for device 10. For example, control circuitry 42 may determine whether the received signal power between the two antennas differs by more than threshold TH2 and, if so, can switch the preferred antenna into use (e.g. by adjusting switch 64 if necessary so that the antenna with the greater received signal power is connected to port TX/RX and path 56).

When the call has been set up using the call establishment procedures of step 82, processing proceeds to state 84, as indicated by line 83. During state 84, wireless circuitry 34 may be operated in a single receiver mode ("single RX mode") in which a given one of receivers 61 and 65 is active and the other receiver is inactive. During the operations of state 84, switch 64 may be configured to operate in a first state in which switch port A is connected to switch port C and switch port B is connected to switch port D (i.e., so that transmit-receive port TX/RX is connected to antenna primary antenna 40A) or in a second state in which switch port A is connected to switch port D and switch port B is connected to switch port C (i.e., so that transmit-receive port TX/RX is connected to secondary antenna 40B). Switch 64 may, for example, be configured so that the TX/RX port transmits and receives radio-frequency signals using the antenna that was determined to be preferable for use in call setup mode 82. To conserve power, cellular telephone transceiver port RX may be maintained in an inactive state.

In single-receiver mode 84, therefore, only receiver 65 in the TX/RX port is generally active, so only one antennas 40A and 40B is in use (i.e., only the current antenna is in use, while the alternate antenna is not being used). During the operations of state 84, the performance of the current antenna may be monitored by evaluating antenna performance metrics such as received signal power level, frame error rate, transmitted signal power level, information on whether responses are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, or other suitable wireless performance parameters. For example, control circuitry 42 may determine whether the received power from the current antenna is less than a power threshold value TH3 or the frame error rate FER is greater than a frame error rate threshold value TH4. If the received power from the current antenna is less than power threshold TH3 or the frame error rate is greater than frame error rate threshold value TH4, control circuitry 42 can conclude that the performance of current antenna is unsatisfactory. If not, control circuitry 42 can conclude that the performance of current antenna is satisfactory.

If the performance of the current antenna is determined to be satisfactory, operations may continue in single-receiver mode 84, as indicated by line 86.

If the performance of the current antenna is determined to be unsatisfactory, device 10 may enter state 92, as indicated by line 88. In state 92, control circuitry 42 may issue control commands on path 52 to activate the previously inactive port (i.e., by turning on receiver 61 so that both receiver 61 and receiver 65 are active). When the receiver in transceiver circuitry 60 that is connected to path 54 (i.e., receiver 61) is activated, transceiver circuitry 60 will be able to use that receiver to monitor the performance of the alternate antenna. If, for example, primary antenna 40A is being used to transmit and receive signals through port TX/RX, circuitry 60 will be able to use receiver 61 on port RX to simultaneously monitor the performance of alternate antenna 40B (e.g., by monitoring wireless performance parameters such as received signal power or other performance metrics). Toggling device 10 between a single receiver mode such as single RX mode 84 and a dual receiver mode such as dual RX mode 92 allows device 10 to evaluate in real time whether wireless performance would be improved by swapping antennas.

If it is determined during the operations of state 92 that the current antenna is performing satisfactorily, the port that is coupled to the alternate antenna can be deactivated and device 10 may toggle back to single RX mode 84, as indicated by line 90. Control circuitry 42 may evaluate the performance of the current antenna during state 92 by determining whether the received power from the current antenna exceeds a predetermined threshold TH5 and by determining whether the frame error rate for signals received from the current antenna is less than a predetermined threshold TH6. If the power of the signals being received by the current antenna exceeds TH5 AND the frame error rate is less than TH6, control circuitry 42 may conclude that the current antenna is operating satisfactorily and may place device 10 in single RX mode 84 to conserve power.

If either the received power from the current antenna is less than threshold value TH5 or the frame error rate FER that is associated with the current antenna is greater than frame error threshold value TH6, control circuitry 42 can concluded that the performance of the current antenna is not satisfactory. When the current antenna is not performing satisfactorily, control circuitry 42 has the option of swapping the antenna assignments in device 10 so that the alternate antenna is switched into use in place of the current antenna.

To determine whether or not use of the alternate antenna would improve performance, control circuitry 42 can compare received signal power measurements from each antenna during the monitoring operations of state 92 and may make other suitable antenna performance comparisons. For example, control circuitry 42 can determine whether the received signal power associated with the alternate antenna (Alternate RX power) is greater than the received signal power for the current antenna (Current RX power) by more than a threshold value TH7. The difference between the received powers for the alternate and current antennas is indicative of the amount of expected improvement in received signal strength if the antennas were to be swapped. Control circuitry 42 can also determine the magnitude of the radio-frequency signal power that is being transmitted using transmit-receive port TX/RX and can evaluate whether the transmitted power level (TX power) is greater than a threshold TH8. Evaluation of the transmitted signal power can provide insight into whether or not device 10 is struggling in its use of the current antenna. If the value of TX power is low, it is unlikely than the current antenna is blocked or is otherwise exhibiting unsatisfactory performance.

Using factors such as these individually or in combination, control circuitry 42 can determine whether or not the performance of the alternative antenna is sufficiently superior to the performance of the current antenna to warrant swapping of the antennas. If, for example, (Alternate RX power–Current RX power>TH7) AND (TX power>TH8), control circuitry 42 can conclude that the performance of the alternate antenna will be preferable to the current antenna. In response, control circuitry 42 can start a first timer (TIMER1), as indicated by line 96 and state 100. If the difference between the alternate antenna received power and current antenna received power drops below TH7 or if TX power drops below TH8 before TIMER1 expires (reaches its predetermined time value), device 10 can return to state 92, as indicated by line 98. So long as the difference between the alternate antenna received power and current antenna received power remains below TH7 or the transmitted signal power (TX power) remains below TH8, device 10 can then remain in state 92, as indicated by line 94.

If TIMER1 expires (i.e., if TIMER1 reaches its predetermined expiration time while TX power remains below TH8 and while Alternate RX power minus Current RX power remains above TH7), control circuitry 42 may enter state 104, as indicated by line 102. In state 104, control circuitry 42 may issue control commands to switch 64 in front end circuitry 62 to swap antennas 40A and 40B. In particular, control circuitry 42 (e.g., storage and processing circuitry 28) may issue commands on path 50 that toggle the position of switch 64 and thereby switch the transceiver port assignments for antennas 40A and 40B. If, for example, switch 64 is in its first state in which switch port A is connected to switch port C and switch port B is connected to switch port D, the swapping operations of state 104 will toggle switch 64 into its second state in which switch port A is connected to switch port D and switch port B is connected to switch port C (i.e., so that transmit-receive port TX/RX is connected to secondary antenna 40B). If, on the other hand, switch 64 is in its second state in which switch port A is connected to switch port D and switch port B is connected to switch port C, the swapping operations of state 104 will toggle switch 64 into its first state in which switch port A is connected to switch port C and switch port B is connected to switch port D (i.e., so that transmit-receive port TX/RX is connected to primary antenna 40A).

After the antennas (and ports) in device 10 are swapped during the operations of state 104, the current antenna will no longer be used as the main antenna for device 10 but rather will serve as the alternate antenna, whereas the antenna that was previously serving as the alternate antenna will become the current antenna for device 10. As indicated by line 106 in FIG. 10, device 10 can be operated in dual receiver mode 108 following antenna swapping during the operations of state 104.

When operating in mode 108, control circuitry 42 can simultaneously monitor the performance of the current and alternate antennas (e.g., using arrangements of the types shown in FIGS. 8 and 9) to determine whether or not device 10 should swap antennas again and to determine whether or not to return to single RX mode. In transceiver circuitry such as illustrative transceiver circuitry 60 of FIG. 3 in which transceiver circuitry 60 includes multiple receivers such as receivers 61 and 65, both receivers may be activated to simultaneously gather antenna performance data from antennas 40A and 40B in parallel. Control circuitry 42 may, for example, use receivers 61 and 65 to monitor antenna performance metrics such as received signal strength, frame error rate, etc. The transmitted signal power associated with transmitters such as transmitter 67 of the TX/RX port may also be monitored to determine how to control wireless circuitry 34 during the operations of FIG. 3.

If it is determined during mode 108 that the current antenna is performing sufficiently well that alternate antenna monitoring functions are not needed, monitoring of the alternate port may be discontinued. With one suitable arrangement, control circuitry 42 may compare the received power from the current antenna to a threshold TH9 and can compare the frame error rate for signals from the current antenna (Current FER) to a frame error rate threshold TH10. If the power of the signals received from the current antenna (Current RX power) is greater than threshold TH9 and if Current FER is less than TH10 or if other suitable antenna performance criteria such as transmit power level criteria are satisfied, control circuitry can conclude that the operation of the current antenna is satisfactory and that dual antenna monitoring functions are not required. As indicated by line 112, control circuitry 42 may therefore respond by deactivating the port associated with the alternate antenna to conserve power (e.g., by turning off receiver 61, which is associated with port RX in FIG. 3). By toggling device 10 from a dual receiver mode such as dual RX mode 108 to a single receiver mode such as single RX mode 114, device 10 may enter a lower power mode that can help to extend battery life.

With the alternate antenna deactivated in this way, device 10 may operate in a single RX mode (mode 114 of FIG. 10), monitoring the performance of the current antenna using the receiver in the active transceiver port (i.e., port TX/RX). If the operation of the current antenna remains satisfactory (i.e., Current RX power remains above threshold TH9 and Current FER remains below TH10), device 10 may remain in mode 114, as indicated by line 118. If, during the operations of mode 114, it is determined that the operation of the current antenna has become unsatisfactory (i.e., the Current RX power drops below threshold TH9 or Current FER rises above TH10), control circuitry 42 may return device 10 to dual RX mode 108 as indicated by line 116. Toggling device 10 to dual RX mode 108 from single RX mode 114 places device 10 in a state in which wireless circuitry 34 may be used to evaluate the relative performance of both antennas in real time to determine whether or not antenna swapping would improve wireless performance.

During the dual antenna monitoring operations of mode 108, the performance of the current and alternate antennas may be monitored by evaluating antenna performance metrics such as received signal power level, frame error rate, or other suitable wireless performance parameters. For example, control circuitry 42 may compare the difference between the alternate antenna received power and current antenna received power (i.e., Alternate RX power–Current RX power) to a threshold TH11. If (Alternate RX power–Current RX power) is greater than TH11, control circuitry 42 can concluded that it is preferable to use the alternate antenna in place of the current antenna and can place device 10 into mode 124, as indicated by line 120.

In mode 124, control circuitry 42 may start a timer (TIMER2). While TIMER2 is counting towards its expiration time, control circuitry 42 may continue to compare the value of Alternate RX power—Current RX power to threshold TH11. If the value of Alternate RX power—Current RX power drops below threshold TH11 before TIMER2 expires, control circuitry 42 can conclude that it is no longer preferable to swap antennas and may return to state 108, as indicated by line 122.

If the value of Alternate RX power—Current RX power remains above threshold TH11 by the time that TIMER2 expires, control circuitry 42 may switch antennas (state 128). For example, control circuitry 42 may issue control commands to switch circuit 64 in front end circuitry 62 to swap antennas 40A and 40B. In particular, control circuitry (e.g., storage and processing circuitry 28) may issue commands on path 50 that toggle the position of switch 64 to switch the transceiver port assignments for antennas 40A and 40B. If, for example, switch 64 was in its first state prior to entering state 128 so that switch port A was connected to switch port C and switch port B was connected to switch port D, the swapping operations of state 104 will toggle switch 64 into its second state in which switch port A is connected to switch port D and switch port B is connected to switch port C (i.e., so that transmit-receive port TX/RX is connected to secondary antenna 40B). If switch 64 was in its second state prior to entering state 128 so that switch port A was connected to switch port D and switch port B was connected to switch port C, the swapping operations of state 128 will toggle switch 64 into its first state in which switch port A is connected to switch port C and switch port B is connected to switch port D (i.e., so that transmit-receive port TX/RX is connected to primary antenna 40A). As indicated by line 130, control circuitry 42 may return device 10 to state 92 following the swapping operations of state 128.

The foregoing is merely illustrative of the principles of this invention and various modifications can be made by those skilled in the art without departing from the scope and spirit of the invention.

What is claimed is:

1. An electronic device, comprising:
   first and second cellular telephone antennas;
   radio-frequency transceiver circuitry that transmits and receives radio-frequency signals through the cellular telephone antennas, wherein the radio-frequency transceiver circuitry has a first receiver that is associated with a first transceiver port and a second receiver that is associated with a second transceiver port; and
   switching circuitry interposed between the radio-frequency transceiver circuitry and the first and second cellular telephone antennas;
   control circuitry configured to change the switching circuitry from a first state, in which the first cellular telephone antenna is coupled to the first receiver and the second cellular telephone antenna is coupled to the second receiver, to a second state, in which the first cellular telephone antenna is coupled to the second receiver and the second cellular telephone antenna is coupled to the first receiver, in response to determining that the performance of the second cellular telephone antenna is superior to the performance of the first cellular telephone antenna;
   wherein the determining that the performance of the second cellular telephone antenna is superior to the performance of the first cellular telephone antenna is based at least partly on, during a transmission by the radio-frequency transceiver on at least one of the antennas, detecting that power being transmitted by the radio-frequency transceiver through the first antenna during the transmission exceeds a threshold.

2. The electronic device defined in claim 1 wherein the determining that the performance of the second cellular telephone antenna is superior to the performance of the first cellular telephone antenna is based upon data gathered in parallel by the first and second receivers when operating the radio-frequency transceiver circuitry in a dual receiver mode.

3. The electronic device defined in claim 1 wherein the determining that the performance of the second cellular telephone antenna is superior to the performance of the first cellular telephone antenna is based upon data gathered in parallel by the first and second receivers when operating the radio-frequency transceiver circuitry in a dual receiver mode and wherein the data includes received signal power measurements associated with both the first and second cellular telephone antennas.

4. The electronic device defined in claim 1 wherein the control circuitry is configured to activate a deactivated receiver when operating in a single receiver mode in response to data received from at least one of the antennas.

5. The electronic device defined in claim 4 wherein the determining that the performance of the second cellular telephone antenna is superior to the performance of the first cellular telephone antenna is based upon data gathered by the first and second receivers when operating the radio-frequency transceiver circuitry in a dual receiver mode and wherein the data includes received signal power measurements associated with both the first and second cellular telephone antennas.

6. The electronic device defined in claim 1 wherein the control circuitry is configured to activate a deactivated receiver when operating in a single receiver mode in response to frame error rate data.

7. The electronic device defined in claim 1,
   wherein in each of the first state and the second state, the first and second cellular telephone antennas each operate according to a first cellular radio access technology (RAT) on a common frequency band.

8. A method of operating an electronic device that has cellular telephone antennas and wireless circuitry that includes first and second receivers that receive radio-frequency signals from the cellular telephone antennas, comprising:
   selectively configuring the wireless circuitry to operate in a single receiver mode in which the first receiver is active and is receiving the radio-frequency signals while the second receiver is inactive and a dual receiver mode in which the first and second receivers are active and are receiving the radio-frequency signals, wherein the first receiver receives radio-frequency signals from a first of the cellular telephone antennas while the second receiver receives radio-frequency signals from a second of the cellular telephone antennas when the wireless circuitry is configured to operate in the dual receiver mode;
   comparing, while operating in the dual receiver mode, performance of the first antenna and performance of the second antenna; and
   in response to determining that the performance of the second antenna is greater than the performance of the first antenna by more than a predetermined threshold amount, adjusting the wireless circuitry so that the first receiver receives radio-frequency signals from the second antenna while the second receiver receives radio-frequency signals from the first antenna;
   wherein the determining that the performance of the second antenna is greater than the performance of the first antenna adjusting the wireless circuitry is based at least partly on, during a transmission by the radio-frequency transceiver on at least one of the antennas, detecting that power being transmitted by the radio-frequency transceiver through the first antenna during the transmission exceeds a threshold.

9. The method defined in claim 8 wherein the comparing performance of the first antenna and performance of the second antenna further comprises:
comparing received signal power data from the first receiver and received signal power data from the second receiver.

10. The method defined in claim 9, wherein the determining that the performance of the second antenna is greater than the performance of the first antenna by more than a predetermined threshold amount further comprises:
determining that received signal power data values from the second receiver are greater than received signal power data values from the first receiver by more than a predetermined threshold amount.

11. The method defined in claim 10, the wireless circuitry comprises at least one transmitter and wherein adjusting the wireless circuitry comprises adjusting the wireless circuitry so that radio-frequency signals from the transmitter are transmitted through the second of the cellular telephone antennas while the second receiver receives radio-frequency signals from the first of the cellular telephone antennas.

12. The method defined in claim 8 further comprising:
when operating in the single receiver mode, activating both the first and second receivers to place the wireless circuitry in the dual receiver mode at least partly based on a determination that received signal power data values from the first receiver are lower than a predetermined power threshold.

13. The method defined in claim 8 further comprising:
when operating in the single receiver mode, activating both the first and second receivers to place the wireless circuitry in the dual receiver mode at least partly based on a determination that frame error rate data values associated with the first receiver are lower than a predetermined frame error rate threshold.

14. The method defined in claim 8 further comprising:
when operating in the single receiver mode, activating both the first and second receivers to place the wireless circuitry in the dual receiver mode at least partly based on a determination that received signal power data values from the first receiver are lower than a predetermined power threshold and at least partly based on a determination that frame error rate data values associated with the first receiver are lower than a predetermined frame error rate threshold.

15. The method defined in claim 14 further comprising:
waiting for a timer to expire before activating the first and second receivers.

16. The method defined in claim 8 further comprising:
when operating in the dual receiver mode, deactivating the second receiver based at least partly on received signal power data gathered using the first receiver.

17. The method defined in claim 8 further comprising:
when operating in the dual receiver mode, deactivating the second receiver based at least partly on frame error rate data.

18. The method defined in claim 8 further comprising:
when operating in the dual receiver mode, comparing received signal power data obtained using the first receiver to a predetermined received power threshold.

19. The method defined in claim 18 further comprising:
when operating in the dual receiver mode, deactivating the second receiver to place the wireless circuitry in the single receiver mode based at least partly on frame error rate data gathered using the first receiver.

20. The method defined in claim 19 wherein deactivating the second receiver comprises deactivating the second receiver to place the wireless receiver in the single receiver mode based at least partly on a comparison of received signal power data obtained using the first receiver to a predetermined received power threshold and comparison of frame error rate data obtained using the first receiver to a predetermined frame error rate threshold.

21. The method defined in claim 8,
wherein during said comparing and said adjusting, the first and second cellular telephone antennas each operate according to a first cellular radio access technology (RAT) on a common frequency band.

22. A method of operating an electronic device that has antennas and that has radio-frequency transceiver circuitry with first and second receivers, comprising:
comparing, while operating the electronic device wherein the first and second receivers are active and are each receiving radio-frequency signals, performance of the first antenna and performance of the second antenna; and
in response to determining that the performance of the second antenna is greater than the performance of the first antenna by more than a predetermined threshold amount, adjusting the switching circuitry from a first state, in which a first of the antennas which serves as a primary antenna in the electronic device is coupled to the first receiver while a second of the antennas which serves as a secondary antenna in the electronic device is coupled to the second receiver, to a second state, in which the second antenna is coupled to the first receiver while the first antenna is coupled to the second receiver;
wherein the determining that the performance of the second antenna is greater than the performance of the first antenna is based at least partly on, during a transmission by the radio-frequency transceiver on at least one of the antennas, detecting that power being transmitted by the radio-frequency transceiver through the first antenna during the transmission exceeds a threshold.

23. The method defined in claim 22 wherein adjusting the switching circuitry further comprises comparing signal power measurements associated respectively with the first and second receivers and toggling the switching circuitry based on the compared signal power measurements.

24. The method defined in claim 22,
wherein the switching circuitry is adjusted between the first state and the second state based on the transmitted signal power level and at least partly on at least one additional antenna performance metric selected from the group consisting of: received signal power level, frame error rate, information on whether responses are being received from a cellular telephone tower corresponding to requests from the electronic device, information on whether a network access procedure has succeeded, information on how many re-transmissions are being requested over a cellular link between the electronic device and a cellular tower, and information on whether a loss of signaling message has been received.

25. The method defined in claim 22,
wherein during said selectively configuring, said comparing, and said adjusting, the first and second antennas each operate according to a first cellular radio access technology (RAT) on a common frequency band.

26. An electronic device, comprising:
first and second cellular telephone antennas;

radio-frequency transceiver circuitry that transmits and receives radio-frequency signals through the cellular telephone antennas, wherein the radio-frequency transceiver circuitry has a first receiver that is associated with a first transceiver port and a second receiver that is associated with a second transceiver port; and switching circuitry interposed between the radio-frequency transceiver circuitry and the first and second cellular telephone antennas;

control circuitry configured to change the switching circuitry from a first state, in which the first cellular telephone antenna is coupled to the first receiver and the second cellular telephone antenna is coupled to the second receiver, to a second state, in which the first cellular telephone antenna is coupled to the second receiver and the second cellular telephone antenna is coupled to the first receiver, in response to determining that the performance of the second cellular telephone antenna is superior to the performance of the first cellular telephone antenna;

wherein in each of the first state and the second state, the first and second cellular telephone antennas each operate according to a first cellular radio access technology (RAT) on a common frequency band.

* * * * *